United States Patent
Means (10) Patent No.: US 9,810,460 B2
(45) Date of Patent: Nov. 7, 2017

(54) REVERSIBLE FLOW ELECTRIC EXPANSION VALVE

(75) Inventor: Stuart Means, Whitehouse, TX (US)

(73) Assignee: Trane International Inc., Piscataway, NJ (US)

( * ) Notice: Subject to any disclaimer, the term of this patent is extended or adjusted under 35 U.S.C. 154(b) by 1344 days.

(21) Appl. No.: 13/276,824

(22) Filed: Oct. 19, 2011

(65) Prior Publication Data

US 2013/0098071 A1  Apr. 25, 2013

(51) Int. Cl.
F25B 30/00 (2006.01)
F16K 31/02 (2006.01)
F25B 41/06 (2006.01)

(52) U.S. Cl.
CPC ...... *F25B 41/062* (2013.01); *F25B 2341/061* (2013.01); *F25B 2341/0653* (2013.01); *Y02B 30/72* (2013.01)

(58) Field of Classification Search
CPC ............ F25B 41/062; F25B 2341/0653; F25B 2341/061; Y02B 30/72
USPC ....... 62/56, 324.6, 180, 528, 527; 137/493.8
See application file for complete search history.

(56) References Cited

U.S. PATENT DOCUMENTS

| | | | | |
|---|---|---|---|---|
| 3,363,433 A | * | 1/1968 | Barbier | F25B 41/062 137/607 |
| 3,640,086 A | | 2/1972 | Brody | |
| 4,501,297 A | * | 2/1985 | Baker | F16K 31/042 137/554 |
| 4,506,518 A | * | 3/1985 | Yoshikawa et al. | 62/180 |
| 4,911,404 A | | 3/1990 | Dorste et al. | |
| 4,964,567 A | | 10/1990 | Heffner et al. | |
| 5,002,089 A | * | 3/1991 | Reedy et al. | 137/493.8 |
| 5,038,579 A | * | 8/1991 | Drucker | F25B 41/06 137/493.9 |
| 5,170,638 A | | 12/1992 | Koenig et al. | |
| 5,251,459 A | | 10/1993 | Grass et al. | |
| 5,419,531 A | * | 5/1995 | Hoehn | F16K 1/38 251/122 |
| 5,524,819 A | | 6/1996 | Heffner et al. | |
| 5,851,003 A | * | 12/1998 | Aoki | F16K 31/04 251/129.11 |

(Continued)

FOREIGN PATENT DOCUMENTS

| | | |
|---|---|---|
| CN | 101080601 A | 11/2007 |
| CN | 201122022 Y | 9/2008 |
| CN | 101363554 A | 2/2009 |
| JP | 2006125751 A | 5/2006 |
| JP | 3145048 U | 9/2008 |
| JP | 4476775 B2 | 6/2010 |

OTHER PUBLICATIONS

Saginomiya Seisakusho, Inc., "Pulse Motor Expansion Valve DC12V Coil," Catalog No. UKV-A171, Drawing No. YN-RD0906-013-A; Sep. 24, 2010, 1 page.

(Continued)

*Primary Examiner* — Jianying Atkisson
*Assistant Examiner* — Kun Kai Ma
(74) *Attorney, Agent, or Firm* — Conley Rose, P.C.; J. Robert Brown, Jr.

(57) ABSTRACT

An HVAC system includes an electronic expansion valve, a motor, an obturator connected to the motor, the obturator being selectively movable in response to operation of the motor, a removable seat selectively received within a complementary portion of the electronic expansion valve, the removable seat being selectively movable in response to operation of the motor.

17 Claims, 7 Drawing Sheets

(56) References Cited

U.S. PATENT DOCUMENTS

| | | | |
|---|---|---|---|
| 6,209,793 B1 | 4/2001 | Taguchi | |
| 6,220,571 B1 * | 4/2001 | Kim | F16K 31/047 251/129.11 |
| 6,418,741 B1 | 7/2002 | Nungesser et al. | |
| 6,561,480 B1 * | 5/2003 | Komiya | F16K 1/38 251/122 |
| 2009/0020716 A1 * | 1/2009 | Hokazono et al. | 251/129.11 |
| 2009/0293519 A1 | 12/2009 | Hayashi | |
| 2009/0293520 A1 * | 12/2009 | Hayashi | F25B 41/062 62/222 |
| 2010/0263397 A1 * | 10/2010 | Suganuma | F16K 15/18 62/324.6 |
| 2011/0120161 A1 * | 5/2011 | Hayashi | F25B 41/062 62/160 |

OTHER PUBLICATIONS

Saginomiya Seisakusho, Inc., "Pulse Motor Expansion Valve," Explanatory Drawing of Valve Operation, Catalog No. UKV-RD0906, Drawing No. YRS-RD0906-001-A; Jul. 16, 2009, 1 page.
Saginomiya Seisakusho, Inc., "Pulse Motor Expansion Valve With Internal Check Valve Function," Catalog No. UKV-F25DU12, Drawing No. YN-RD0906-012-A; Sep. 30, 2010, 1 page.
Saginomiya Seisakusho, Inc., "Pulse Motor Expansion Valve With Internal Check Valve Function," Catalog No. UKV-F25DU11, Drawing No. YN-RD0906-011-A; Sep. 30, 2010, 1 page.
Canadian Office Action; Application No. 2,791,869; dated Nov. 27, 2013; 3 pages.
Chinese Office Action; Application No. 201210398633.3; dated Oct. 11, 2014; 16 pages.

* cited by examiner

REVERSIBLE FLOW ELECTRIC EXPANSION VALVE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some heating, ventilation, and air conditioning (HVAC) systems may comprise an electronic expansion valve (EEV) and also be configured as a so-called heat pump.

SUMMARY OF THE DISCLOSURE

In some embodiments of the disclosure, an HVAC system comprising An HVAC system, comprising an electronic expansion valve is disclosed. In some embodiments, the electronic expansion valve comprises a motor, an obturator connected to the motor, the obturator being selectively movable in response to operation of the motor, and a removable seat selectively received within a complementary portion of the electronic expansion valve, the removable seat being selectively movable in response to operation of the motor.

In other embodiments of the disclosure, an electronically controlled expansion valve, comprising a motor, a movable obturator connected to the motor, a removable seat selectively received within a complementary portion of the electronically controlled expansion valve, the removable seat comprising a meter bore configured to selectively receive at least a portion of the obturator, and a retraction rod extending from the obturator and through at least a portion of the removable seat, the retraction rod being slidably received through a retraction hole of the removable seat, and the removable seat being captured along the retraction rod between the obturator and a seat catch of the retraction rod is disclosed.

In yet other embodiments of the disclosure, a method of operating a heat pump HVAC system, comprising providing an electronically controlled expansion valve comprising a motor, an obturator movable by the motor, a removable seat movable by the motor, and a complementary portion for selectively receiving the removable seat, and locating the obturator relative to the removable seat to selectively allow operation of the electronically controlled expansion valve in at least one of a closed state with substantially no fluid flow through the valve, a metered state with fluid flow through the valve in a first direction, and an unmetered state with fluid flow through the valve in a first direction is disclosed.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Some heat pump and/or reversible flow HVAC systems comprise EEVs each having a pointed metering needle type of obturator that may be movable relative to a complementary seat of a flow port. In some applications, the HVAC systems may further comprise one or more check valves operable to selectively reroute refrigerant flow around an EEV during so-called reverse flow operation or heat pump operation of the HVAC system. In other embodiments, an EEV comprising a pointed metering needle type of obturator may allow reverse flow through the EEV by removing the pointed tip of the metering needle well past a boundary of the associated flow port. In some embodiments, even moving the pointed metering needle type of obturator well past the boundary of the associated flow port may not resolve performance limitations, such as, but not limited to, undesirable pressure differentials associated with reverse flow of refrigerant through the associated flow port. Accordingly, this disclosure provides EEV systems and methods that present no need for rerouting refrigerant around the EEV during reverse refrigerant flow.

Figure 1:
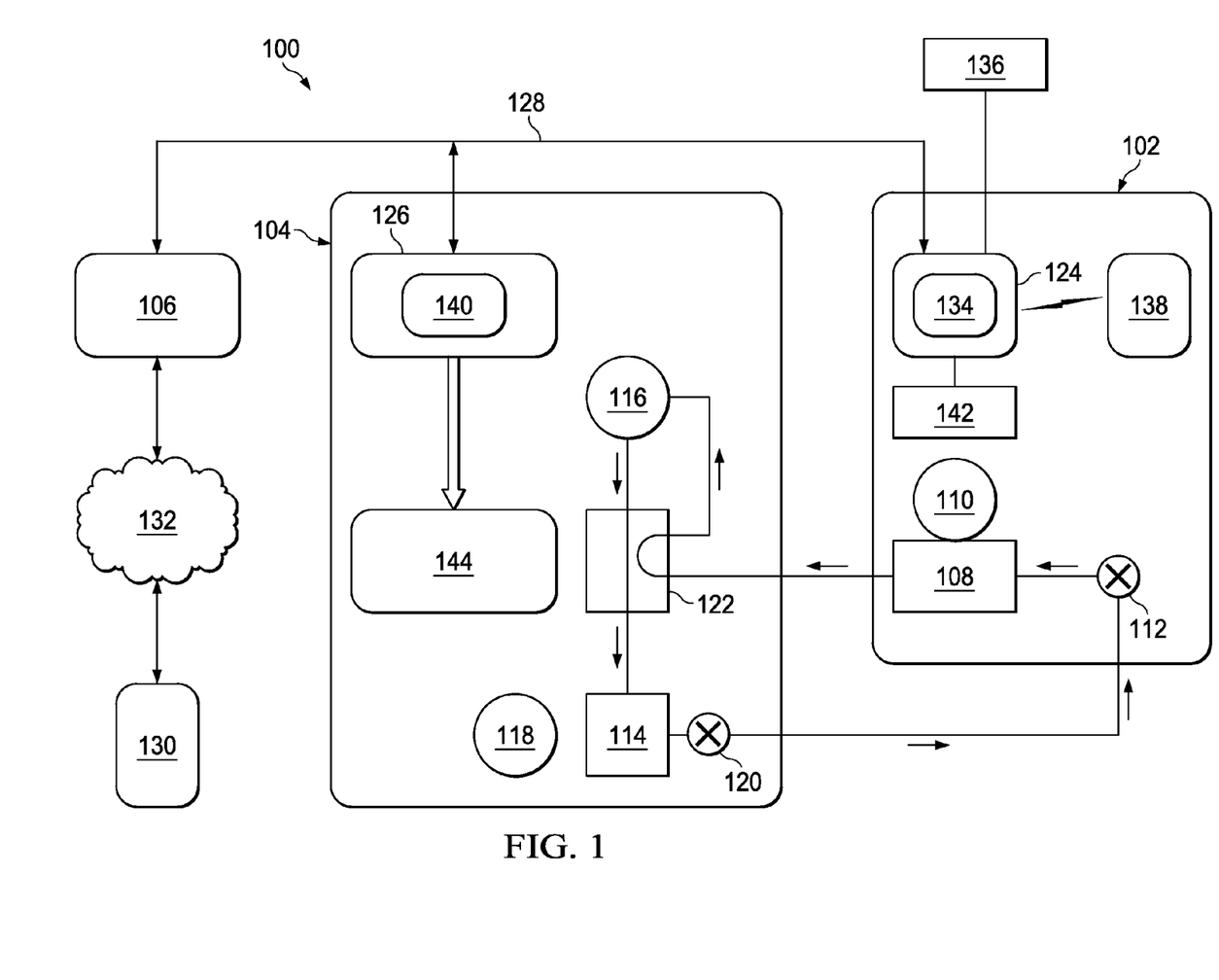
FIG. 1 is simplified schematic diagram of an HVAC system according to an embodiment of the disclosure.

Referring now to FIG. 1, a simplified schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system.

In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet enabled mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

In some embodiments, the indoor EEV controller 138 may be configured to receive information regarding temperatures and/or pressures of the refrigerant in the indoor unit 102. More specifically, the indoor EEV controller 138 may be configured to receive information regarding temperatures and/or pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may flow from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to a two-phase (vapor and gas) mixture. The two phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108, causing evaporation of the liquid portion of the two phase mixture. The refrigerant may thereafter re-enter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
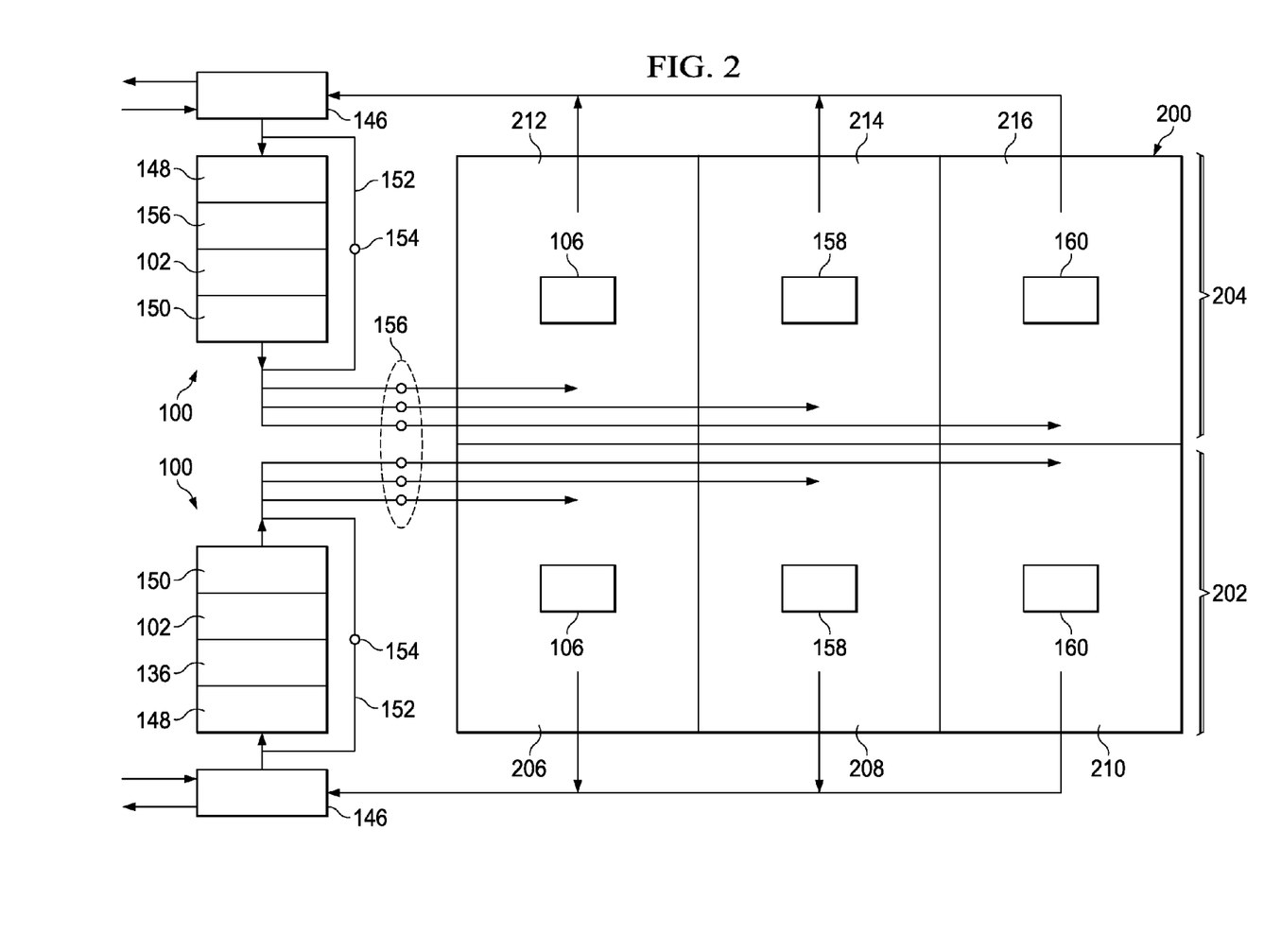
FIG. 2 is a simplified schematic diagram of the air circulation paths of the HVAC system of FIG. 1.

Referring now to FIG. 2, a simplified schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a humidity of the circulating air. The bypass duct 152 may be utilized to regulate air pressures within the ducts that form the circulating air flow paths. In some embodiments, air flow through the bypass duct 152 may be regulated by a bypass damper 154 while air flow delivered to the zones 206, 208, 210, 212, 214, and 216 may be regulated by zone dampers 156.

Still further, each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

Still referring to FIG. 2, the system controllers 106 may be configured for bidirectional communication with each other and may further be configured so that a user may, using any of the system controllers 106, monitor and/or control any of the HVAC system 100 components regardless of which zones the components may be associated. Further, each system controller 106, each zone thermostat 158, and each zone sensor 160 may comprise a humidity sensor. As such, it will be appreciated that structure 200 is equipped with a plurality of humidity sensors in a plurality of different locations. In some embodiments, a user may effectively select which of the plurality of humidity sensors is used to control operation of one or more of the HVAC systems 100.

Referring now to FIGS. 3-6, an EEV 300 is shown according to an embodiment of the disclosure. The EEV 300 comprises a valve body 302 comprising an interior space 303 connected to a side tube 304 and an inline tube 306. The EEV 300 further comprises a selectively movable obturator 308 may be integrally connected to a movable rod 310. An electronically controlled motor 312 may be at least partially housed within the valve body 302 and may be configured to provide rotation to selectively move the obturator 308 along an axis 314 that is substantially coaxial with the inline tube 306. In this embodiment, the obturator 308 comprises a generally frustoconical shape having a base 316, a side surface 318, and a truncated tip 320. The obturator 308 may further comprise a retraction rod 322 extending from the truncated tip 320 toward the inline tube 306 along the axis 314. The retraction rod 322 may comprise a seat catch 324 that comprises an outer diameter larger than an outer diameter of the refraction rod 322. In this embodiment, the seat catch 324 may be located substantially at a distal end (opposite the rod 310) of the refraction rod 322. However, in alternative embodiments, the seat catch 324 may be located at any other suitable location along the length of the retraction rod 322.

In this embodiment, the EEV 300 further comprises a seat receptacle 326 configured to selectively receive a removable seat 328. The seat receptacle 326 is configured to join the valve body 302 to the inline tube 306 in fluid communication. The seat receptacle 326 comprises a first bore 330, a second bore 332, and a third bore 334, each of the bores 330, 332, 334 being substantially coaxial with each other and lying substantially coaxial with axis 314.

The removable seat 328 comprises a generally cylindrical tubular body 338 bounded on one end by an obturator interface 340 and on the other end by a catch interface 342. The obturator interface 340 may comprise an outer diameter greater than an outer diameter of the body 338, the diameters being selected so that the obturator interface 340 generally extends to near the wall of the first bore 330 while the body 338 generally extends to near the wall of the second bore 332. In some embodiments, the obturator interface 340 substantially blocks fluid flow through the associated end of the body 338 except for passage through a centralized meter bore 344 that comprises an interface surface 346 configured to complement the side surface 318 of the obturator 308 so that the obturator 308 may be moved relative to the obturator interface 340 to selectively vary a fluid flow rate through the centralized meter bore 344. The catch interface 342 generally comprises a disc-shaped wall that substantially blocks fluid flow through the assoced end of the body 338 except for passage through ports 348 that, in some embodiments, comprise a radial array of through holes centered about the axis 314. The catch interface 342 further comprises a retraction hole 350 through which retraction rod 322 extends with the seat catch 324 being located outside the body 338. The retraction rod 322 and the retraction hole 350 may be relatively sized so that the retraction rod 322 is slidable within the retraction hole 350, in some embodiments, without presenting a significant passage for fluid to pass between them.

Figure 3:
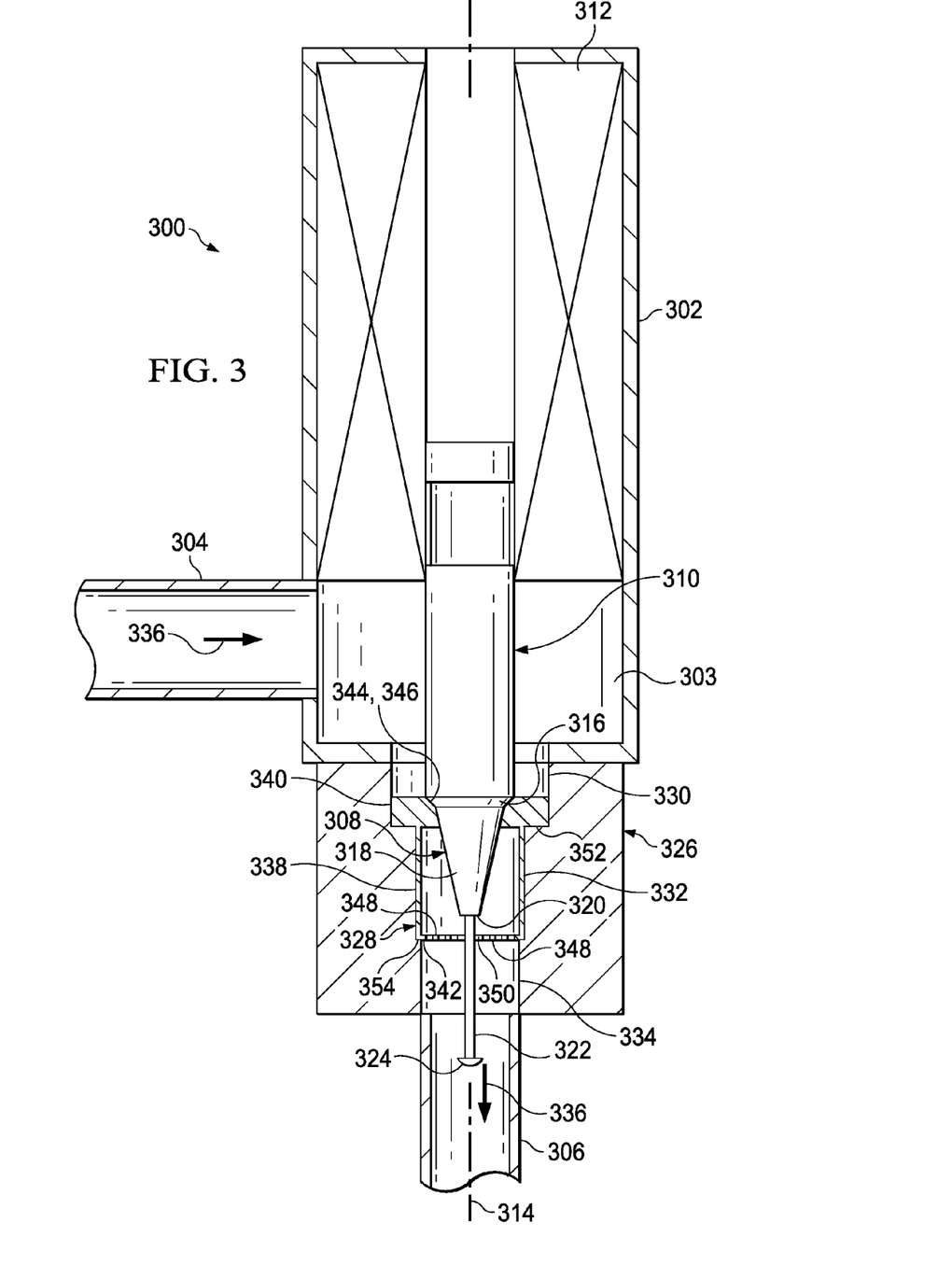
FIG. 3 is a schematic diagram of an EEV of the HVAC system of FIG. 1 in a closed state of operation.

Referring now to FIG. 3, the EEV 300 is shown in a so-called closed state where the component parts of the EEV 300 do not allow a substantial fluid flow between the interior space 303 and the in-line tube 306. In the closed state, the removable seat 328 is received within the complementary first bore 330 and second bore 332. More specifically, the obturator interface 340 is received within the first bore 330 so that the obturator interface 340 substantially forms a seal between the wall of the first bore 330 and a first shelf 352 of the first bore 330. Further, the body 338 is received within the second bore 332 so that the body 338 substantially forms a seal between the wall of the second bore 332 and a second shelf 354 of the second bore 332. In the closed state, the retraction rod 322 may be positioned, in some embodiments due to operation of the motor 312, so that the seat catch 324 extends beyond the valve body 302 and into the in-line tube 306. In some embodiments, the rod 310 may be located such that the obturator 308 contacts and/or substantially forms a seal with removable seat 328. More specifically, in some embodiments, the side surface 318 of the obturator 308 may contact and/or be located so near the interface surface 346 of the centralized meter bore 344 that fluid flow through the centralized meter bore 344 is substantially reduced and/or prevented. In some embodiments, such a closed state may be useful in selectively controlling aggregation of refrigerant in a portion of the refrigerant circuit while performing maintenance on a different portion of the refrigerant circuit. In some cases, such refrigerant management may be referred to as "pumping down" the HVAC system so that the compressor is used to pump into a sealed portion of the circuit, thereby allowing another portion of the refrigerant circuit to be opened to the environment during maintenance and/or repair.

Figure 4:
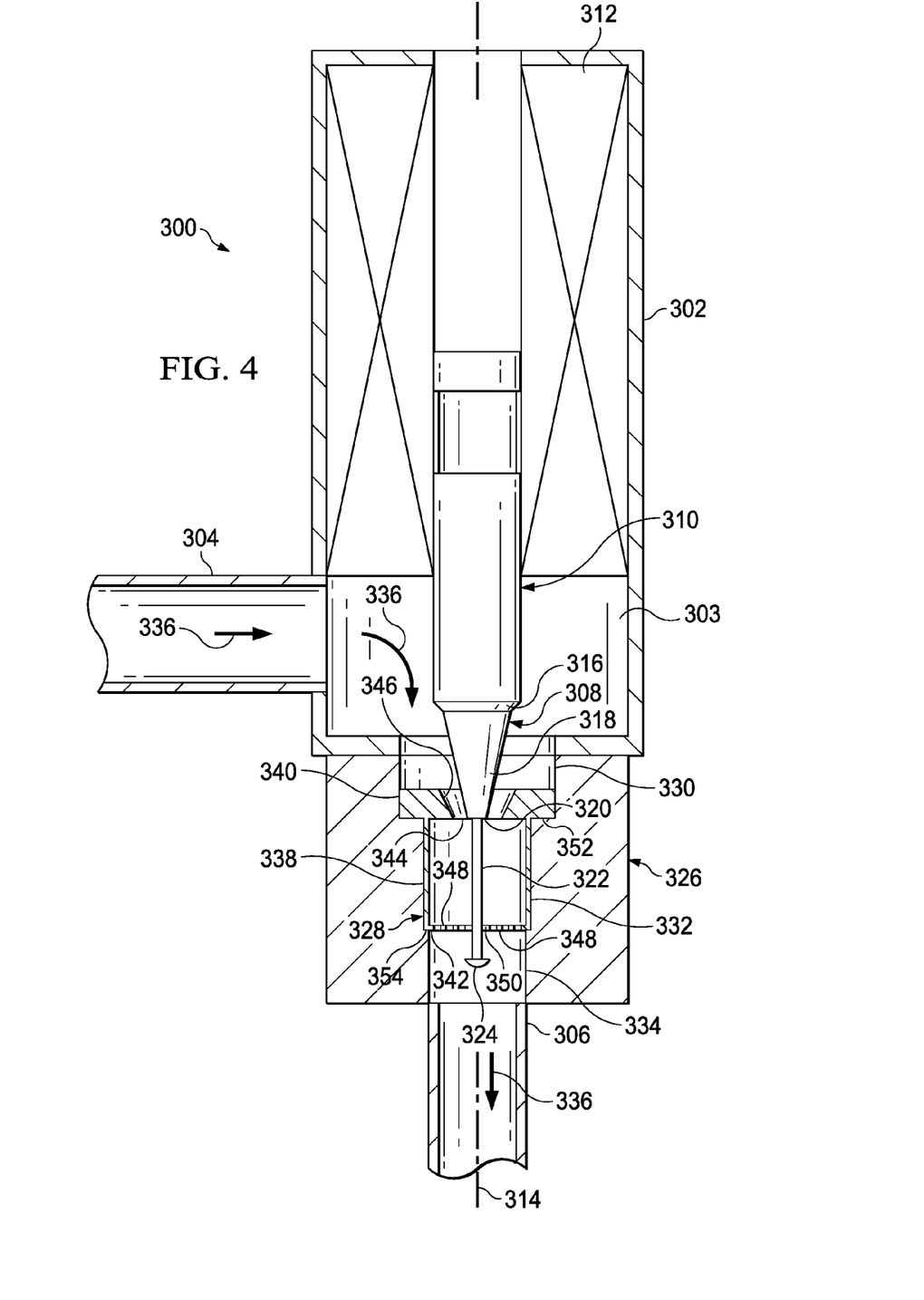
FIG. 4 is a schematic diagram of the EEV of FIG. 3 in a metered state of operation.

Referring now to FIG. 4, the EEV 300 is shown in a so-called metering state where the component parts of the EEV 300 allow fluid flow between the interior space 303 and the in-line tube 306 in a relatively controlled manner. In the metering state, the removable seat 328 is received within bores 330, 332 in substantially the same manner described above with regard to the EEV 300 in the closed state shown in FIG. 3. However, the EEV 300 in the metering state differs from the EEV in the closed state at least insofar as the side surface 318 of the obturator 308 may be offset from and/or be located so far from the interface surface 346 of the centralized meter bore 344 that fluid flow through the centralized meter bore 344 is allowed in a substantially known and/or controlled manner. In some embodiments, the fluid flow through the centralized meter bore 344 may be altered by activating the motor 312 to move the rod 310 and attached obturator 308 along the axis 314 to increase or reduce the size of a gap and/or offset between the obturator 308 and the interface surface 346. In some embodiments, the seat catch 324 may be located nearer the catch interface 342 as compared to the distance between the seat catch 324 and the catch interface 342 when the EEV 300 is in a closed state. In some embodiments, such a metering state may be useful in selectively controlling an expansion and/or pressure change in refrigerant passing through the EEV 300. In some embodiments, the metering state may be used when the fluid and/or refrigerant flow is in a so-called normal or forward refrigerant flow direction 336 which most generally indicates refrigerant movement from the side tube 304 to the in-line tube 306 via the interior space 303.

Figure 5:
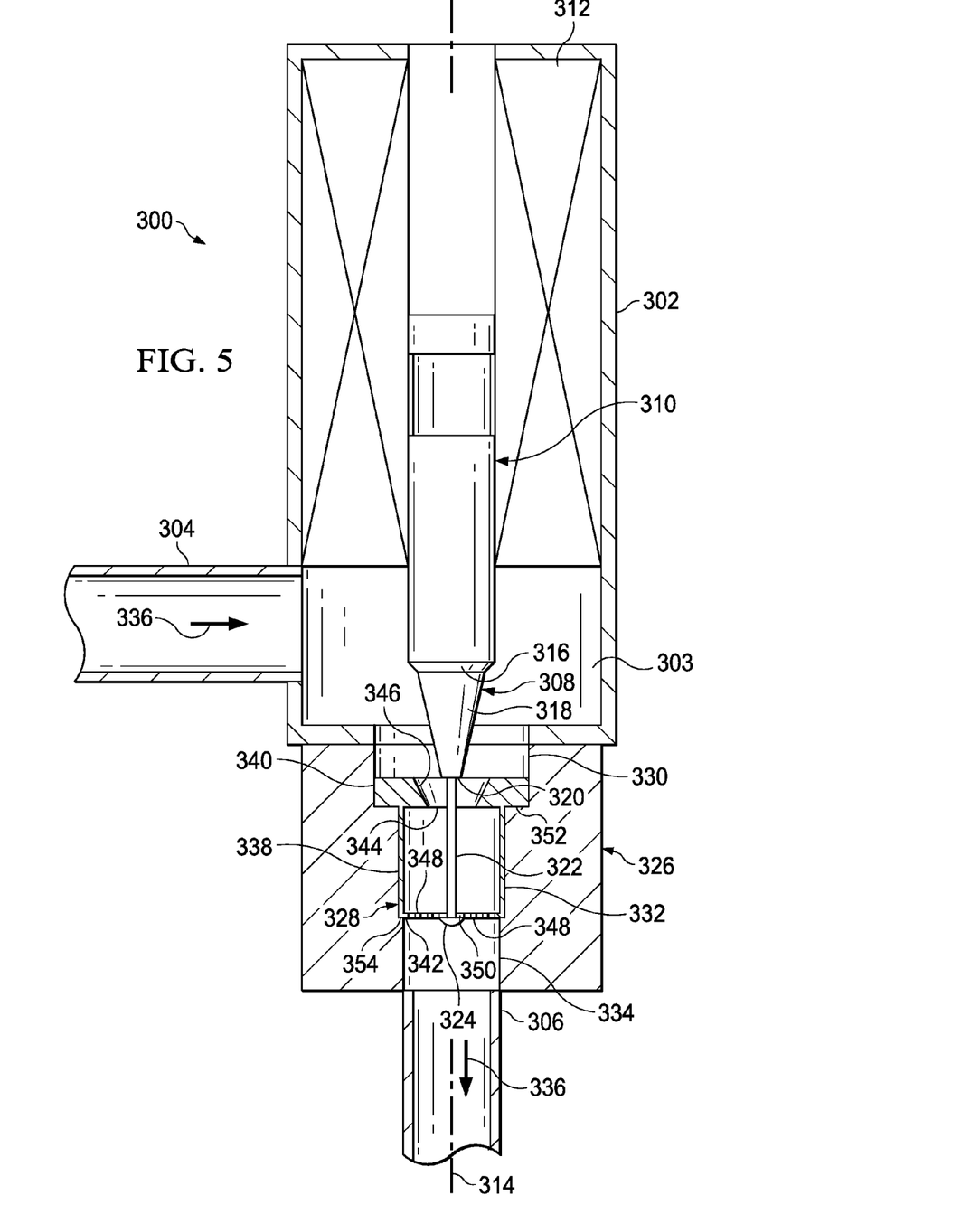
FIG. 5 is a schematic diagram of another EEV of the disclosure in an unmetered state of operation.

Referring now to FIG. 5, the EEV 300 is shown in a so-called unmetered state where the component parts of the EEV 300 allow fluid flow between the interior space 303 and the in-line tube 306 in a relatively uncontrolled manner. In the unmetered state, the removable seat 328 is received within bores 330, 332 in substantially the same manner described above with regard to the EEV 300 in the metered state shown in FIG. 4. However, the EEV 300 in the unmetered state differs from the EEV in the metered state at least insofar as the side surface 318 of the obturator 308 may be offset from and/or be located so far from the interface surface 346 of the centralized meter bore 344 that fluid flow through the centralized meter bore 344 is no longer substantially known and/or controlled clearly as a function of a space between the side surface 318 of the obturator 308 and the interface surface 346 of the centralized meter bore 344. While there may be many positions of the obturator 308 that yield the performance of the unmetered state shown in FIG. 5, the position of the rod 310, obturator 308, and seat catch 324 represent, an extreme example of how far the obturator 308 may be moved toward the motor 312 along the axis 314 without upsetting the location of the removable seat 328 within the bores 330, 332. In some embodiments, during fluid and/or refrigerant flow in a second, reverse direction 356 with the obturator 308 in the unmetered position shown in FIG. 5, fluid flow through the centralized meter bore 344 may be undesirably restricted. In some cases, the undesirable restriction an undesirable pressure differential across the EEV 300 while the EEV 300 may be intended to merely serve a pass through functionality.

Figure 6:
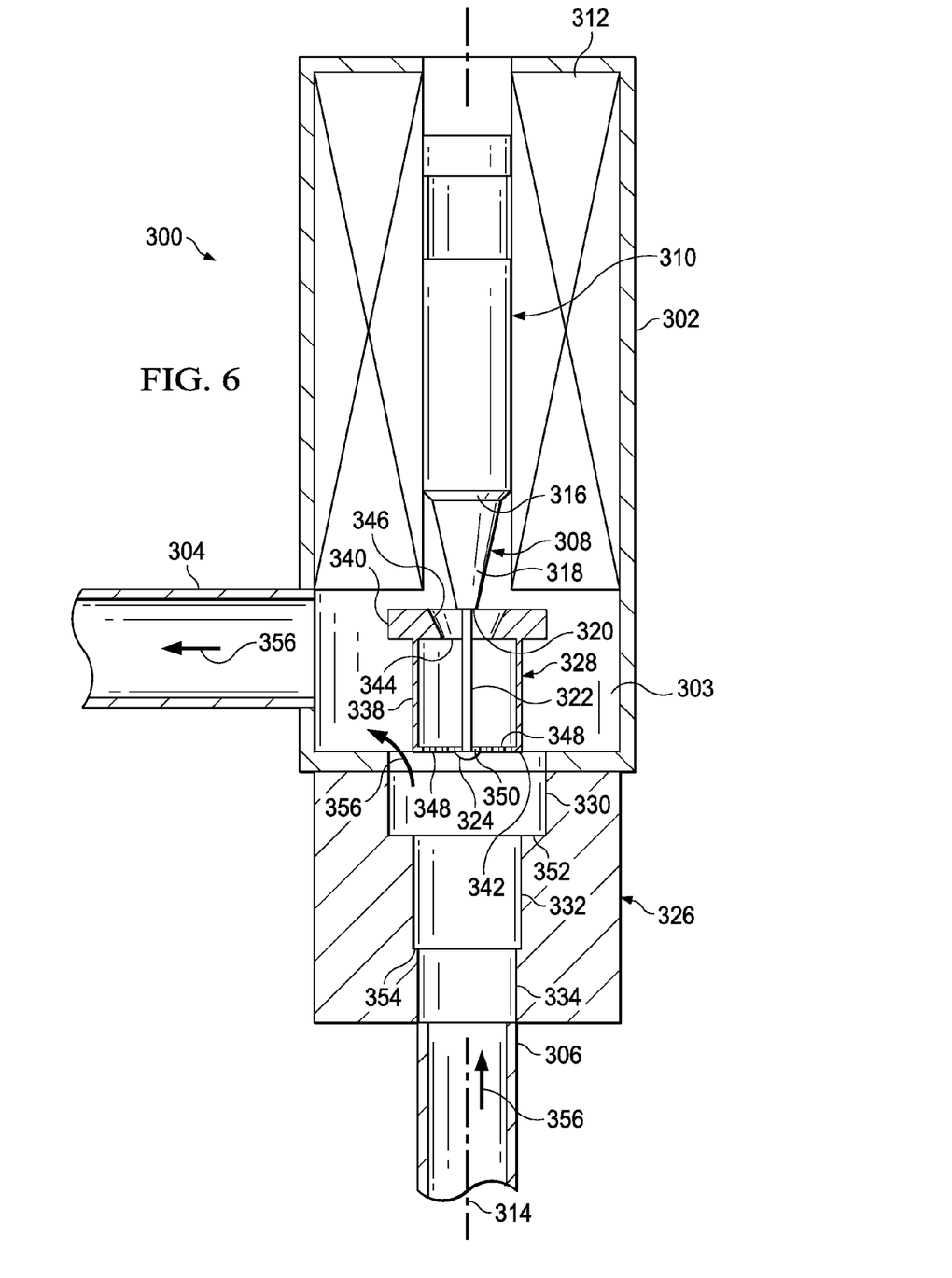
FIG. 6 is a schematic diagram of the EEV of FIG. 5 in an unrestricted state of operation.

Referring now to FIG. 6, the EEV 300 is shown in a so-called unrestricted state where the component parts of the EEV 300 allow fluid flow between the interior space 303 and the in-line tube 306 in a relatively uncontrolled manner. In the unrestricted state, the removable seat 328 removed from bores 330, 332 so that the removable seat 328 is located relatively further toward the motor 312 as compared to the location of the removable seat 328 as located in FIGS. 3-5. Further, because the removable seat 328 is removed from the bores 330, 332, fluid and/or refrigerant need not pass through ports 348 or any other portion of the removable seat 328. In some embodiments, the removable seat 328 may be so offset from the seats 330, 332 that a substantial portion of fluid and/or refrigerant may pass through the EEV 300 by passing between the side tube 304 and the in-line tube 306 via the interior space 303 without entering the body 338 of the removable seat 328.

Figure 7:
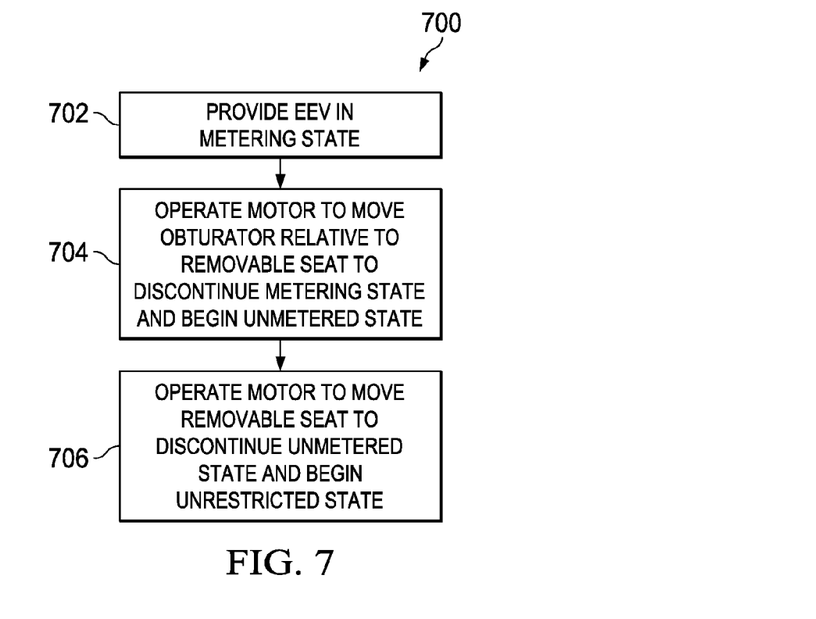
FIG. 7 is a flowchart of a method of operating the HVAC system of FIG. 1 that comprises the EEV of FIGS. 3-6.

Referring now to FIG. 7, a method 700 of operating the EEV 300 is shown. At block 702, the EEV 300 may be provided in a metering state substantially similar to that shown in FIG. 4. The EEV 300 may be operated to slightly vary the position of the obturator 308 relative to the movable seat 328 to provide desired pressure differentials across the EEV 300, thereby assisting accomplishment of a useful refrigeration cycle. However, in some embodiments, it may be desirable to subsequently reverse flow of fluid and/or refrigerant and discontinue using the EEV 300 in the metering state. At block 704, the motor 312 may be operated to draw the rod 310 and the connected obturator 308 further away from the removable seat 328 and toward the motor 312 until the EEV 300 is no longer in the above-described metering state, but rather, has been placed in an unmetered state substantially similar to that shown in FIG. 5. As mentioned above, the unmetered state may not sufficiently reduce a pressure drop across the EEV 300. Accordingly, at block 704, the motor 312 may be operated to move the removable seat 328 to a position that removes the EEV 300 from the above-described unmetered state to an unrestricted state substantially similar to that shown in FIG. 6.

In operation, to move the removable seat 328 from the bores 330, 332, the motor 312 may be operated to move the rod 310, attached obturator 308, and attached retraction rod 322 toward the motor 312 and away from the in-line tube 306. From the above-described closed and/or metering states of FIGS. 3 and 4, respectively, the seat catch 324 may resultantly be moved closer to engagement with the catch interface 342 of the removable seat 328. As shown in FIG. 5, the unmetered state may comprise the seat catch 324 being located in abutment against the catch interface 342. Still further, the unmetered state may further comprise the above-described abutment of the seat catch 324 with the catch interface 342 with the removable seat 328 being at any of a variety of configurations in which the removable seat 328 is partially removed from one or more of bores 330, 332. The motor 312 may further be operated to fully remove the removable seat 328 from both of the bores 330, 332 so that the fluid and/or refrigerant need not pass through the removable seat 328 during passage through the EEV 300. In some embodiments, the above-described motor assisted transition from the unmetered state to the unrestricted state may overcome problems of the removable seat 328 becoming lodged in one or more of the bores 330, 332 so that reverse flow of fluid and/or refrigerant alone cannot remove the removable seat 328 from the bores 330, 332. Further, the above-described embodiments provide a guaranteed position of the removable seat 328 relative to the bores 330, 332 as opposed to allowing fluid and/or refrigerant flow to dictate a location of the removable seat 328 relative to the bores 330, 332. In alternative embodiments, the removable seat 328 and bores 330, 332 may be shaped differently and/or replaced by components comprising different geometric features, however, in some of those other embodiments, the removable seat and associated portions of the EEV may nonetheless comprise features that are complementary to each other so that the removable seat may selectively from a substantially fluid tight seal with the associated portions of the EEV while being removable through operation of a motor of the EEV.

In some embodiments, one or more EEVs 112, 120 may be configured as an EEV 300. In alternative embodiments, an obturator may comprise any other suitable shape for selectively generating a pressure drop. Further, in alternative embodiments, a truncated tip may comprise a concave tip, a convex tip, an undulating tip, an angled tip, and/or any other truncated shape relative to the remainder of the side surface.

Still further, any of the interfaces between the various surfaces of the obturators disclosed herein may be chamfered, comprise a smooth radius, and/or may otherwise be configured to promote or reduce linear and/or non-linear fluid flow in response to fluid contacting the various interfaces.

Figure 8:
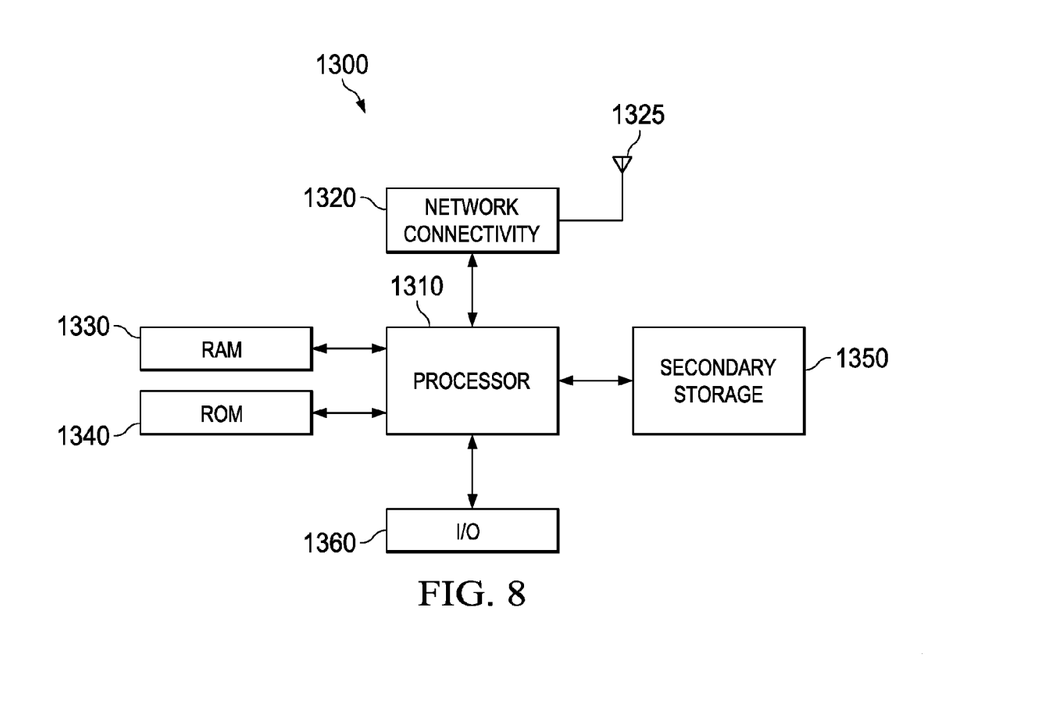
FIG. 8 is a simplified schematic diagram of a general purpose processor or computer that may be used to implement one or more of the embodiments of the disclosure.

FIG. 8 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components disclosed herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An HVAC system, comprising:
an electronic expansion valve, comprising:
  a motor;
  an obturator connected to the motor, the obturator being selectively movable in response to operation of the motor;
  a removable seat selectively received within a complementary portion of the electronic expansion valve; and
  a retraction rod extending from the obturator and through at least a portion of the removable seat, the retraction rod being slidably received through a retraction hole of the removable seat, the removable seat being captured along the retraction rod between the obturator and a seat catch of the retraction rod, and the removable seat being selectively removable from the complementary portion in response to operation of the motor.

2. The HVAC system of claim 1, wherein the obturator is connected to the motor via a rod at least partially housed within an interior space of the electronic expansion valve.

3. The HVAC system of claim 1, wherein the removable seat comprises at least one cylindrical tubular portion.

4. The HVAC system of claim 1, wherein the electronic expansion valve is operable between a closed state and an unrestricted state.

5. The HVAC system of claim 4, wherein the unrestricted state comprises (1) the obturator being removed from the removable seat and (2) the removable seat being removed from the complementary portion.

6. The HVAC system of claim 5, wherein the complementary portion comprises a substantially cylindrical bore.

7. The HVAC system of claim 1, wherein the obturator comprises a substantially frustoconical portion that is selectively received within a centralized meter bore of the removable seat.

8. An electronically controlled expansion valve, comprising:
  a motor;
  a movable obturator connected to the motor;
  a removable seat selectively received within a complementary portion of the electronically controlled expansion valve, the removable seat comprising a meter bore configured to selectively receive at least a portion of the obturator; and
  a retraction rod extending from the obturator and through at least a portion of the removable seat, the refraction rod being slidably received through a retraction hole of the removable seat, and the removable seat being captured along the refraction rod between the obturator and a seat catch of the refraction rod;
  wherein the removable seat is selectively removable from the complementary portion in response to operation of the motor.

9. The valve of claim 8, wherein the obturator comprises a frustoconical shape.

10. The valve of claim 8, wherein operation of the motor rotates at least one of the obturator and the retraction rod.

11. The valve of claim 8, wherein operation of the motor moves at least one of the obturator and the retraction rod relative to the removable seat.

12. The valve of claim 8, wherein operation of the motor moves the removable seat relative to the complementary portion of the electronic expansion valve.

13. A method of operating a heat pump HVAC system, comprising:
  providing an electronically controlled expansion valve comprising a motor, an obturator movable by the motor, a removable seat movable by the motor, a complementary portion for selectively receiving the removable seat, and
  a retraction rod extending from the obturator and through at least a portion of the removable seat, the retraction rod being slidably received through a retraction hole of the removable seat, and the removable seat being captured along the retraction rod between the obturator and a seat catch of the retraction rod, wherein the removable seat is selectively removable from the complementary portion in response to operation of the motor; and
  locating the obturator relative to the removable seat to selectively allow operation of the electronically controlled expansion valve in at least one of a closed state with substantially no fluid flow through the valve, a metered state with fluid flow through the valve in a first direction, and an unmetered state with fluid flow through the valve in a first direction.

14. The method of claim 13, further comprising:
operating the motor to change a position of the obturator relative to the removable seat.

15. The method of claim 13, further comprising:
operating the motor to change a position of the removable seat relative to the complementary portion.

16. The method of claim 13, further comprising:
operating the motor to remove the obturator from being at least partially received within the removable seat; and
operating the motor to at least partially remove the removable seat from the complementary portion.

17. The method of claim 16, further comprising:
flowing refrigerant through the valve in a second flow direction opposite the first flow direction.

* * * * *